F. S. BARZEE.
AUTOMATIC TRAP NEST.
APPLICATION FILED SEPT. 19, 1907.
899,709.
Patented Sept. 29, 1908.
2 SHEETS—SHEET 1.
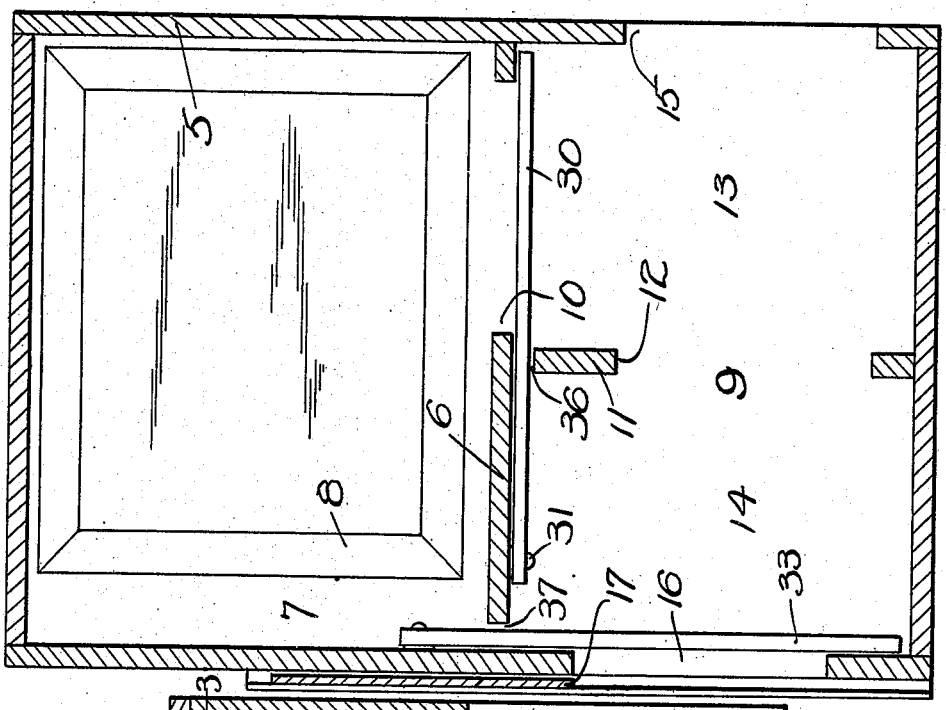
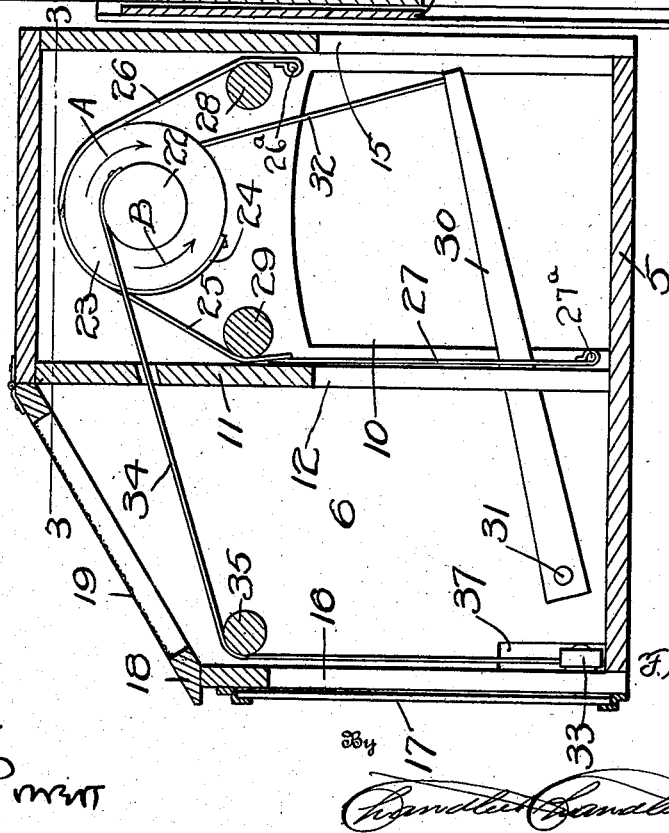
Witnesses
J. C. Miller
Inventor
F. S. Barzee
By Chandler & Chandler
Attorneys

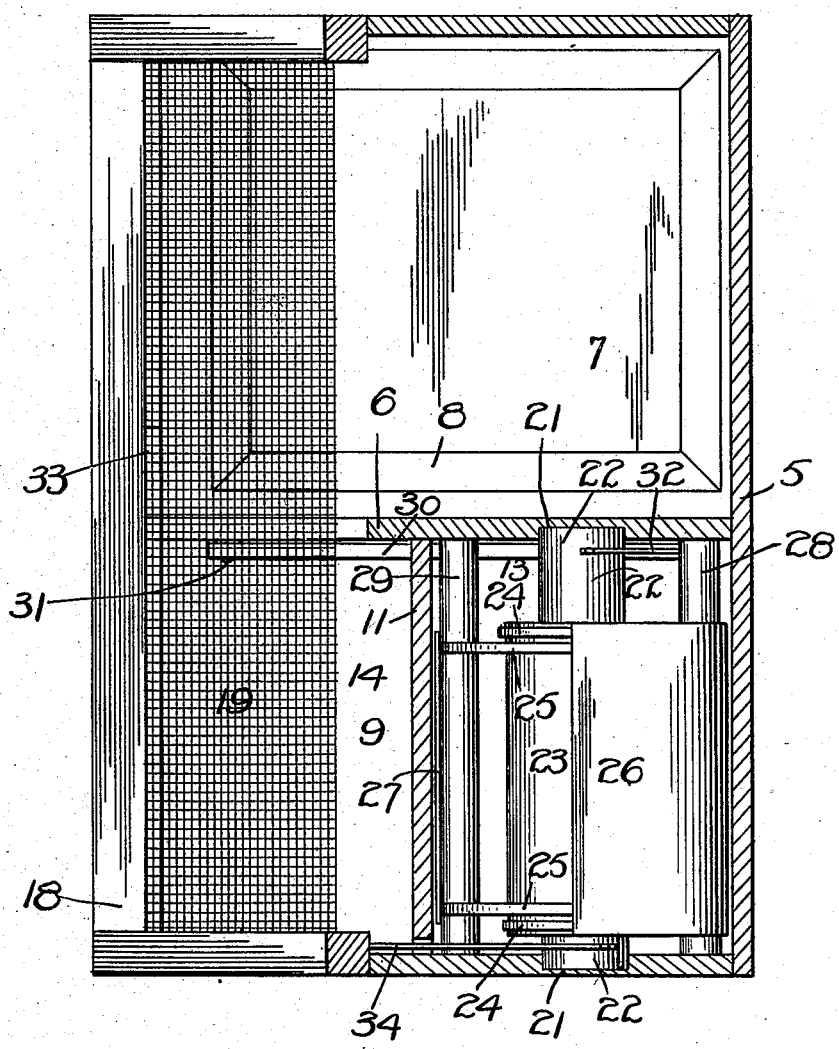

UNITED STATES PATENT OFFICE.

FRANCIS S. BARZEE, OF EVERETT, WASHINGTON.

AUTOMATIC TRAP-NEST.

No. 899,709.   Specification of Letters Patent.   Patented Sept. 29, 1908.

Application filed September 19, 1907. Serial No. 393,698.

*To all whom it may concern:*

Be it known that I, FRANCIS S. BARZEE, a citizen of the United States, residing at Everett, in the county of Snohomish, State of Washington, have invented certain new and useful Improvements in Automatic Trap-Nests; and I do hereby declare the following to be a full, clear, and exact description of the invention, such as will enable others skilled in the art to which it appertains to make and use the same.

This invention relates to new and useful improvements in nests and it has more particular reference to a nest designed especially for laying hens and including automatically operating doors for preventing access to the nest when the hen is sitting thereon.

In connection with a nest of the above type, the invention aims as a primary object to provide a novel construction, combination and arrangement of parts, the details of which will appear in the course of the following description in which reference is had to the accompanying drawings forming a part of this specification, like characters of reference designating similar parts throughout the several views, wherein:

Figure 1 is a section taken vertically and transversely through a nest constructed in accordance with the present invention. Fig. 2 is a horizontal section thereof, illustrating the floor or ground plan. Fig. 3 is a detailed sectional view taken on the line 3—3 of Fig. 1, illustrating a roller comprehended in the present invention and from which the automatically operated doors are hung.

The nest forming the subject matter of the present invention comprises a housing 5 of box-like form and having a central transverse wall 6 in a plane parallel to the end walls thereof. The wall 6 thus divides the housing into a nest compartment 7 provided with a nest-frame 8 and into an entrance compartment 9.

The wall 6 is formed with an enlarged opening 10 affording a passageway between the compartments 7 and 9. The compartment 9 is in turn provided with a partition 11 extending at right angles to the wall 6 and having a doorway 12. The partition 11, it will thus be seen divides the compartment 9 into two chambers 13 and 14. The side wall of the housing, which likewise forms the side wall of the chamber 13 is provided with a door opening 15 and the side wall of the housing which likewise forms the side wall of the chamber 14 is also provided with a door opening 16, which may, when desired be closed by a sliding door 17.

The roof of the housing includes an inclined portion 18 which is preferably hinged to constitute a lid and which is of open construction to afford a frame for a wire mesh body 19, through which the interior of the compartment 7 is exposed to view, so that fowls without the nest may readily observe whether or not a hen is sitting thereon.

The end walls of the compartment 13 adjacent the top of the housing are constructed centrally thereof with recesses 21 affording bearings for the reduced end portions 22 of a roller 23. Secured to the latter in oppositely extending pairs are respective straps 24 and 25, the straps 24 being arranged on the outer side of the straps 25. The straps 24 support a flexible door 26 which is designed to close the opening 15 and the straps 25 support a flexible door 27 which is designed to close the opening 12, the doors 26 and 27 as well as the respective straps 24 and 25 being trained over suitably supported guide rollers 28 and 29 and at their lower ends supporting transverse rods 26[a] and 27[a] respectively, which maintain said doors taut and consequently assure of their perfect operation.

Adjacent to the opening 10, a lever 30 is pivoted to the wall 6 as at 31 for movement in a vertical plane. The lever 30 has at its forward end connection with a cord 32 which is trained over and connected to one of the ends 22.

Adjacent to the door opening 16 is a lever 33 which is pivoted to the adjacent side of the housing 5, and which at its extreme end has connection with a cord 34, the latter being trained over a suitable supported guide pulley 35, and over the other end 22 of the roller 23, the cord 34 being connected to the said end 22.

The levers 30 and 33 have pivotal movement through respective vertical slots 36 and 37 formed in the partition 11 and the walls 6. In describing the operation, it is assumed that the lever 30 is in the raised position of Fig. 1 and that the nest is empty. In such position of the lever 30, the door 26 will be raised and partially wound upon the roller 23.

Assuming that a hen desires to lay an egg in the nest in the compartment 7, the said hen will walk through the opening 15 into the chamber 13. The door 27 will be lowered so that the hen will enter into the compartment 7 through the opening 10. As the hen passes through the door, she will step on the lever 30 and her weight will depress the said lever, thereby through the connections described rotating the roller 23 in the direction of the arrow A of Fig. 1. Such rotation of the roller 23 lowers the door 26 and closes the opening 15 and raises the door 27.

When the hen leaves the housing 5, the lever 30 will be in its lowermost position and consequently instead of stepping upon the same, she will step over the same, and walk through the opening 12. The lever 33 when the lever 30 is lowered will be in its raised position and consequently in order to pass through the door opening 16, the hen must step on the lever 33 thereby lowering the lever 33 and moving the roller 23 by the connections described in a reverse direction as indicated by the arrow B. Such reverse movement of the roller 23 results in raising the door 26 and lowering the door 27, thus resetting the parts. Hence when the hen desires to return to her nest, she enters into the chamber 13 and thence into the compartment 7 actuating the parts in the manner above explained. It will be apparent that when the hen is on the nest, the opening 15 will be closed and an intruding hen can only enter the housing 5 by means of the door 16. When the intruding hen enters, she steps on the lever 33, and lowers said lever thereby lowering the door 27. Hence the progress of the intruding hen is barred by the door 27 and she can go no further than the chamber 14. It will be apparent that if the roller 23 has been actuated by an intruding hen, when the laying hen leaves her nest she will step on the lever 30 and raise the door 27 so as to effect her exit in the manner previously explained.

The invention may be used as a trap nest by closing the door 17 so that when the hen enters the nest, the door 26 will be lowered and no means will be apparent for her escape, so that she will remain on the nest until released.

The invention is simple in structural details, inexpensive to manufacture, and practical and efficient in use.

From the foregoing description, it will be seen that simple and efficient means are provided for accomplishing the objects of the invention, but, while the elements herein shown and described are well adapted to serve the functions set forth, it is obvious that various minor changes may be made in the proportions, shape, and arrangement of the several parts, without departing from the spirit and scope of the invention as defined in the appended claims.

What is claimed is:

A nest of the type set forth, comprising a housing including side and end walls and divided by a transverse wall into a nest compartment and an entrance compartment, the said wall having an opening affording communication between the said compartments, a wall arranged in the entrance compartment at right angles to said first named wall and having a door opening, the said last named wall dividing the entrance compartment into two chambers, the side walls of the housing being provided with door openings communicating with the respective chambers of the entrance compartment, automatic doors for closing said door opening in said last named dividing wall and for closing the door opening in one of said side walls, means for holding one of said doors open and the other of said doors closed, means adjacent to said first named door opening and designed to be operated by the weight of a hen stepping thereupon for actuating the doors to close the opening in said last named side wall and to open the opening in said last named dividing wall and means arranged adjacent to the opening in the remaining side wall and adapted to be operated by the weight of a hen stepping thereon for reversing the relation of said doors obtained by said first named means.

In testimony whereof, I affix my signature, in presence of two witnesses.

FRANCIS S. BARZEE.

Witnesses:
J. Q. DOUTHIT,
CARRIE J. BUSHER.